(12) United States Patent
Almog et al.

(10) Patent No.: US 8,091,124 B2
(45) Date of Patent: Jan. 3, 2012

(54) CACHING PUBLIC OBJECTS WITH PRIVATE CONNECTIONS

(75) Inventors: Itai Almog, Tel-Aviv (IL); Tomer Shiran, Haifa (IL)

(73) Assignee: Microsoft Corporation, Redmond, WA (US)

(*) Notice: Subject to any disclaimer, the term of this patent is extended or adjusted under 35 U.S.C. 154(b) by 980 days.

(21) Appl. No.: 11/710,335

(22) Filed: Feb. 23, 2007

(65) Prior Publication Data

US 2008/0209524 A1 Aug. 28, 2008

(51) Int. Cl.
H04L 29/06 (2006.01)
(52) U.S. Cl. ......................................................... 726/12
(58) Field of Classification Search .................. 726/2, 3, 726/4, 5, 26, 27, 28, 29, 11–14
See application file for complete search history.

(56) References Cited

U.S. PATENT DOCUMENTS

| | | | |
|---|---|---|---|
| 5,729,734 A | | 3/1998 | Parker et al. |
| 5,991,810 A | * | 11/1999 | Shapiro et al. ............. 709/229 |
| 6,157,930 A | | 12/2000 | Ballard et al. |
| 6,606,663 B1 | * | 8/2003 | Liao et al. .................. 709/229 |
| 6,801,927 B1 | | 10/2004 | Smith et al. |
| 6,832,222 B1 | | 12/2004 | Zimowski |
| 6,894,981 B1 | | 5/2005 | Coile et al. |
| 6,950,936 B2 | | 9/2005 | Subramaniam et al. |
| 2002/0026507 A1 | | 2/2002 | Sears et al. |
| 2002/0112152 A1 | | 8/2002 | VanHeyningen et al. |
| 2005/0152305 A1 | | 7/2005 | Ji et al. |
| 2006/0069782 A1 | | 3/2006 | Manning et al. |
| 2006/0080546 A1 | | 4/2006 | Brannon et al. |
| 2006/0230265 A1 | | 10/2006 | Krishna |

FOREIGN PATENT DOCUMENTS

| | | |
|---|---|---|
| KR | 10-2002-0044870 A | 6/2002 |
| KR | 1020020044870 A | 6/2002 |

OTHER PUBLICATIONS

Berendt, et al., "Analysis of navigation behaviour in web sites integrating multiple information systems", Date: 1999, http://warhol.wiwi.hu-berlin.de/~berendt/berendt-spiliopoulou-vldbj00.pdf.
Rotiroti, Domenico, "Strong Authentication in Web Proxies", Date: 2006, pp. 915-916, http://delivery.acm.org/10.1145/1140000/1135942/p915-rotiroti.pdf?key1=1135942&key2=3039694611&coll=GUIDE&dl=GUIDE&CFID=5865890&CFTOKEN=853191.
Zhao, et al., "WSF: An HTTP-level Firewall for Hardening Web Servers", http://www.eecs.umich.edu/~zhaoxin/papers/iasted.pdf.
International Search Report dated Jul. 30, 2008 for Application No. PCT/US2008/054608, 9 pages.
International Search Report and Written Opinion Received for PCT Application No. PCT/US2008/054608, mailed on Jul. 30, 2008, 9 pages.

* cited by examiner

*Primary Examiner* — Gilberto Barron, Jr.
*Assistant Examiner* — Simon Kanaan

(57) ABSTRACT

Described is a technology by which a web proxy server forwards a client request for content to a web server over an unauthenticated connection, including when the client already has an authenticated connection to that web server. If the web content is received in response, the content is public, whereby the web proxy server caches the content and returns the content to the client. If the requested content is not received because of a need for authentication, the content is re-requested over the client's authenticated connection, or if one does not yet exist, returns the response to the client to complete the authentication process to establish an authenticated connection. A learning mechanism (e.g., that persists known private URLs) may be coupled to the selection mechanism to maintain references to objects that are private, and thereby avoid redundant retrieval attempts for known private objects over unauthenticated connections.

15 Claims, 3 Drawing Sheets

CACHING PUBLIC OBJECTS WITH PRIVATE CONNECTIONS

BACKGROUND

One type of web proxy product accelerates clients' access to web content via web caching. In general, these products cache web objects that were returned to clients, and use those cached objects for subsequent client requests, thereby saving the expense of making additional calls to the web server that provides the content.

However, web proxies act as a public cache, and are therefore not allowed to cache any private content that is targeted to a specific user, e.g., when authentication is required to obtain an authenticated objects. A well-known standard, RFC 2616, defines that if an authentication request (e.g., an HTTP "401 Unauthorized" status code) is returned as a response to an object request, an authenticated connection resulting from a completed authentication process is required to receive that content, and the web proxy cannot cache any additional content that is received using the authenticated connection. As a result, web proxies are not very successful in caching content from web sites that include authenticated content. Moreover, web proxies are also not very affective in caching content from web sites that have both authenticated and unauthenticated content, because unauthenticated content cannot be cached if an authenticated content was already provided on the same connection.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which a web proxy server forwards a client request for content to a web server over an unauthenticated connection, including when the client already has an authenticated connection to that web server. If the web content is received in response to the request, the content is public, whereby the web proxy server caches the content and returns the content to the client. If the requested content is not received because of a need for authentication, the content is re-requested over the client's authenticated connection.

In one example implementation, a web proxy server is configured to cache public objects received from web servers, and to return a cached object in response to a client request when the object is cached and valid. Otherwise, the web proxy server forwards the client request for the object to a web server. Via a selection mechanism, for an object that may or may not be private, the client request if forwarded to the web server via an unauthenticated connection, to determine based on the web server response whether the object is private or public. A learning mechanism (e.g., that persists known private URLs for some duration) may be coupled to the selection mechanism to establish when a requested object is known to be private from a previous attempt, or may not be private.

If the web server returns an object in response to the request via the unauthenticated connection, the web proxy server caches the object and returns the object to the client. If the object is not returned because authentication is needed, and the client has an already-existing authenticated connection to the web server, the selection mechanism re-requests the object over the existing authenticated connection (rather than establishing yet another authenticated connection). If the object is not returned because authentication is needed and the client does not have an already-existing authenticated connection to the web server, the selection mechanism returns the response indicating authentication is needed to the client to allow the client to complete the authentication process. The learning mechanism may update its internal database with the URL of a non-returned object due to authentication needs, because such an object is now known to be private.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards allowing a web proxy server to cache the public objects of a site that do not require authentication, (but are not marked as public) and are mixed with private objects, and also return the private objects (without caching them), thus complying with the RFC 2616 standard. Note that HTTP includes a mechanism that web site designers may use to specify that certain content is public so it will get cached even when using an "authenticated connection;" this is done by using the cache directive "public" (the exact HTTP header is called cache-control), but is not always used.

In one aspect, the authentication that is referred to herein is primarily of a type that requires an authenticated connection be used for private objects, e.g., referred to as HTTP authentication. Examples of security authentication protocols that use authenticated connections include, Basic authentication, Digest authentication, NT LAN Manager (NTLM) authentication, and so forth. However, any appropriate HTTP authentication protocol may be used.

Further, as will be understood, the technology provides benefits with websites that comprises a mix of authenticated and unauthenticated content. Often such websites are internal (i.e., located on an organization's intranet but not on the public Internet), but any given website may have such a mixture. As will be understood, however, the technology does not prevent content from being downloaded from websites having entirely private content.

Thus, as will be understood, the technology described herein is not limited to any type of protocol or website configuration, or any type of web proxy model other than one that has caching capabilities. As such, the present invention is not limited to any particular embodiments, aspects, concepts, protocols, structures, functionalities or examples described herein. Rather, any of the embodiments, aspects, concepts, protocols, structures, functionalities or examples described herein are non-limiting, and the present invention may be used various ways that provide benefits and advantages in computing and accessing network content in general.

Figure 1:
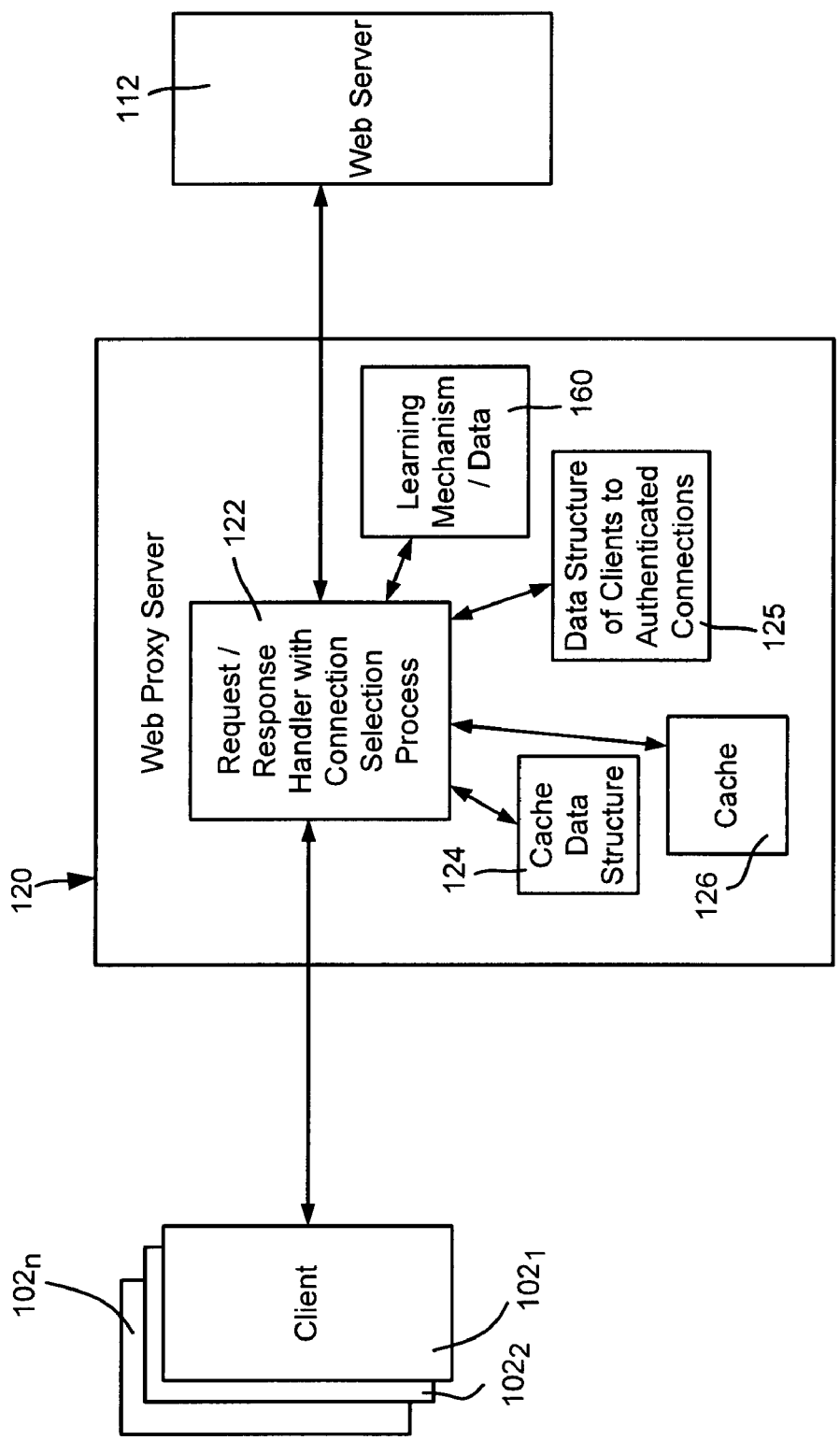
FIG. 1 shows an illustrative example of a network having a web proxy server using selective connections for separately obtaining authenticated and unauthenticated content corresponding to web page content.

Turning to FIG. 1, there is shown an example network configuration in which clients $102_1$-$102_n$ issue requests for content to a web server 110. A web proxy server 120 (e.g., an Internet Security and Acceleration, or ISA Server available from Microsoft Corporation), receives the requests from the clients $102_1$-$102_n$. The clients $102_1$-$102_n$ may have no knowledge of the presence of the web proxy server 120, that is, the web proxy server is transparent, although it is feasible to have one or more of the clients $102_1$-$102_n$ make requests to the web proxy server 120 to perform some operation on behalf of the clients $102_1$-$102_n$.

When the web proxy server 120 first receives a web request from the client (e.g., $102_1$), a request/response handler 122 in the web proxy server 120 searches a local cache 124 data structure to see if the requested content is present in the cache 126 and still valid. If so, the content (e.g., a main page or an embedded object described thereon) is returned from the cache 126. If not cached, a request for the object is sent to the web server 112, or if found but not valid, a freshness check is sent to the web server 112, to either obtain an updated object or a new timestamp that verifies the object is still valid. This aspect is conventional caching for efficiency purposes.

As is known, certain requests to the web server are returned with a special response (an authentication request, or challenge) indicating that authentication is needed to download the object, which is a private object. The client $102_1$ obtains this request and authenticates according to the indicated authentication protocol (e.g., Basic, Digest). If successful, an authenticated connection is established and the object is returned. The client $102_1$ is then associated with this connection, e.g., in a data structure 125 that maps clients to authenticated connections.

In prior systems, once a client has an authenticated connection, the web proxy server uses the authenticated connection for subsequent client requests. By RFC standards, any object received over an authenticated connection cannot be cached, unless that object is explicitly marked as public, (which is often not the case for public objects). Thus, caching is not allowed for unmarked public objects that are requested by the client over the authenticated connection.

Instead of the prior model, the web proxy server 120 exemplified in FIG. 1 includes a connection selection process/mechanism that does not necessarily use the authenticated connection for a client, even if the client has one. Instead, when an object is requested and the server needs to forward the request to the web server, the web proxy server 120 first attempts to retrieve the object using a separate unauthenticated connection. If the object is returned, the object may be cached and returned to the client. If the object is not returned, (that is, an error 401 authentication request was instead returned by the web server) and the client already has an authenticated connection (as maintained in the data structure 125, the object is re-requested over that authenticated connection.

Note that if the client does not yet have an authenticated connection but a private object was requested, the web requested to the web server will return an authentication request, whereby the web proxy server 120 allows the client to complete the authentication process. Thereafter, a proper response or negotiation results is an authenticated connection, and this authenticated connection is associated with the client for use in retrieving private object that this specific client requests from this specific domain.

Figure 2:
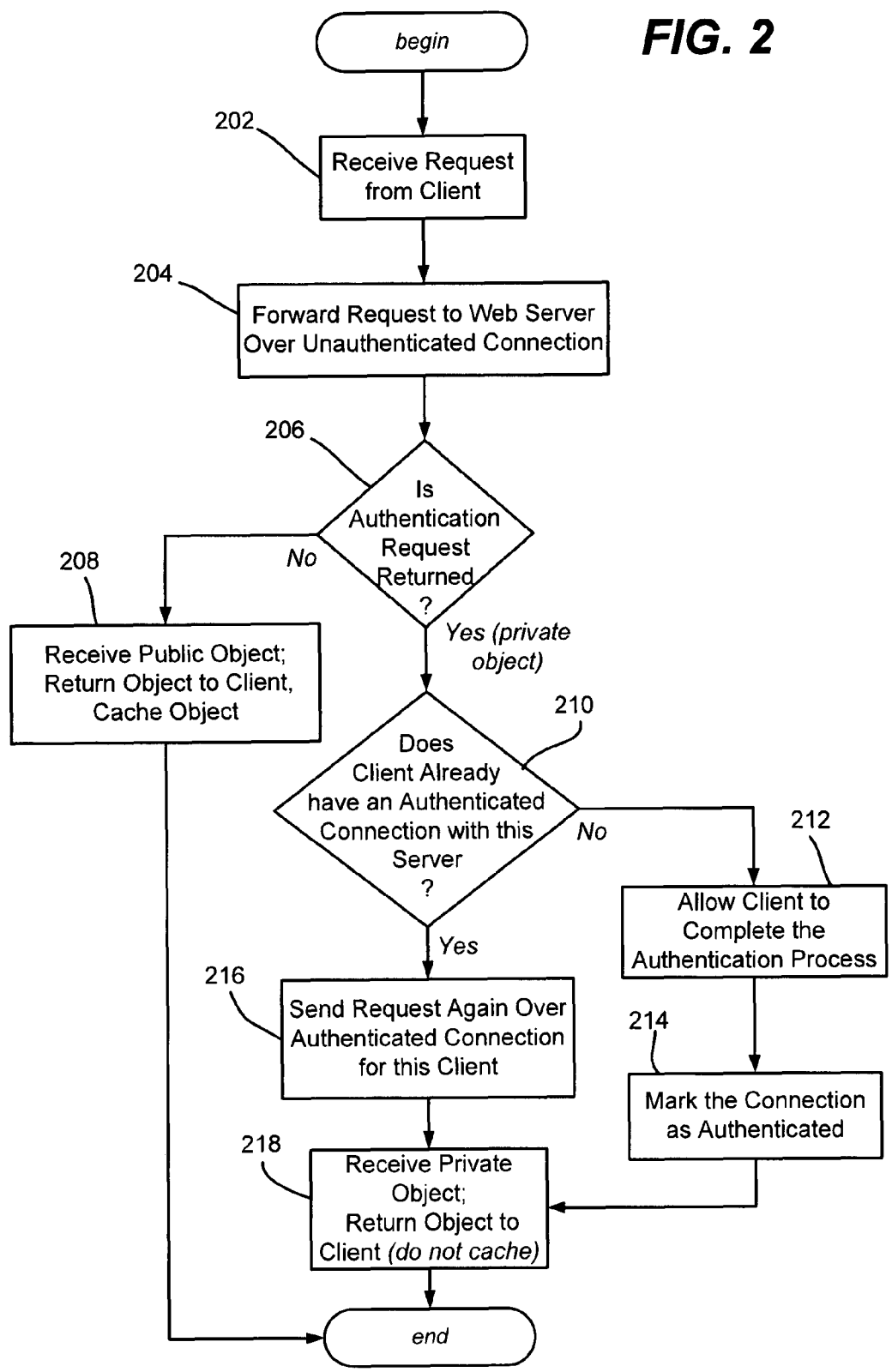
FIG. 2 is a flow diagram representing example steps taken by a web proxy server to separately obtain authenticated an unauthenticated content corresponding to web page content.

Turning to the example steps of FIG. 2, step 202 requests receiving a request form the client for content. Note that FIG. 2 does not explicitly show the possibility that a requested object may be returned from the cache, and for purposes of this example assumes that the object is needed from the web server. Further, FIG. 2 assumes typical operation for purposes of explanation, that is, the communication between the client, web proxy and web server is proper and no errors are returned.

Step 204 represents forwarding the request to the web server over an unauthenticated connection, and step 206 evaluates the response. More particularly, whenever this specific user is sending a new request to the same domain, the web proxy server checks whether the new object requires authentication or not. To do so, the web proxy server initiates an additional connection to the web server as needed and sends the request over the unauthenticated connection.

One possible response is that the server has returned an authentication request. If it does not and instead returns the object, it is known that the website considered the object appropriate to return over the unauthenticated connection, meaning that the requested object is public (unless for example another cache directive specifies otherwise, e.g., that the object is private). In this situation, step 206 branches to step 208 which caches the object (if the object is otherwise not identified as non-cacheable) and return the object to the requesting client.

If an authentication request if returned instead of the object, the object is private and does require authentication (and also cannot be cached unless explicitly marked as public). Step 210 evaluates whether this client already has an authenticated connection with this server. If not, step 210 branches to step 212 where the client is allowed to complete the authentication process, which establishes an authenticated connection to obtain the requested object. Step 214 associates the connection with this particular client, and step 210 returns the object to the client, without caching.

Thereafter, for subsequent requests for private objects from this client to the server, step 210 will branch to step 216, which sends another request over the authenticated connection. When the object is received at step 218, the object is returned to the client without caching.

Thus, as can be seen from FIG. 2, each request from a client is first attempted to be satisfied via an unauthenticated connection (step 204), whereby any public objects will be returned and can be cached (step 208). When a object is requested that turns out to be private, step 206 will detect the authentication request, and re-attempt the request using the client's authenticated connection (if it exists at step 216), or allow the client to complete the authentication process (step 212) to obtain the private object as well as establish an authenticated connection.

Returning to FIG. 2, it can be readily appreciated that a learning mechanism/data 160 can be used to remember which URLs require authentication (and possibly which may be cached). For example, a URL may be recognized from a previous request as corresponding to a private object, whereby there is no need to attempt to obtain that object over the unauthenticated connection if an authenticated connection already exists for the requesting client, e.g., step 202 can skip to step 216. This can help reduce trial and error requests by way of the unauthenticated connection for known private content.

Exemplary Operating Environment

Figure 3:
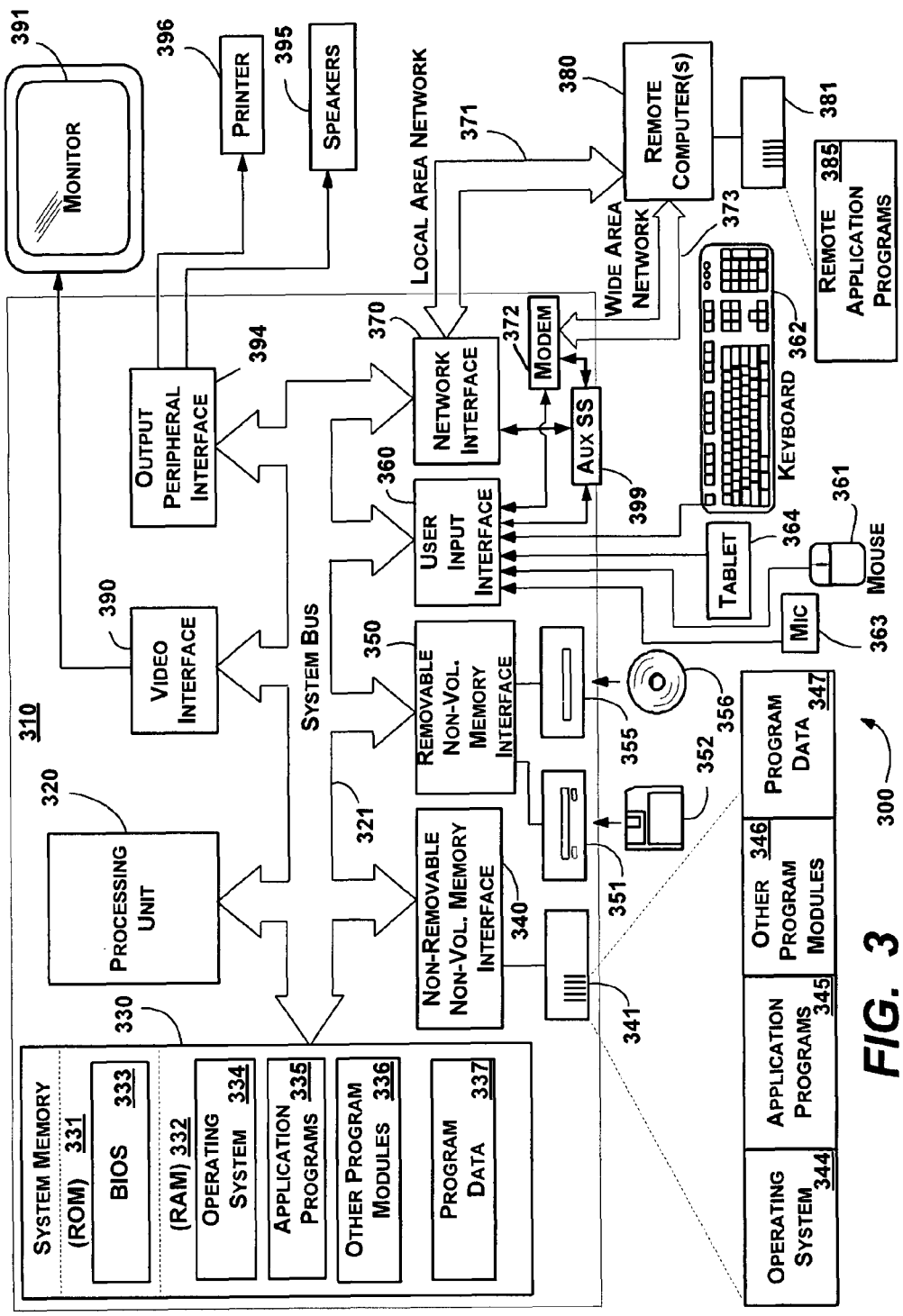
FIG. 3 shows an illustrative example of a general-purpose network computing environment into which various aspects of the present invention may be incorporated.

FIG. 3 illustrates an example of a suitable computing system environment 300 on which the web proxy server 120 (FIG. 1) or 121 (FIG. 2) may be implemented, for example.

The computing system environment 300 is only one example of a suitable computing environment and is not intended to suggest any limitation as to the scope of use or functionality of the invention. Neither should the computing environment 300 be interpreted as having any dependency or requirement relating to any one or combination of components illustrated in the exemplary operating environment 300.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 3, an exemplary system for implementing various aspects of the invention may include a general purpose computing device in the form of a computer 310. Components of the computer 310 may include, but are not limited to, a processing unit 320, a system memory 330, and a system bus 321 that couples various system components including the system memory to the processing unit 320. The system bus 321 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnection (PCI) bus also known as Mezzanine bus.

The computer 310 typically includes a variety of computer-readable media. Computer-readable media can be any available media that can be accessed by the computer 310 and includes both volatile and nonvolatile media, and removable and non-removable media. By way of example, and not limitation, computer-readable media may comprise computer storage media and communication media. Computer storage media includes volatile and nonvolatile, removable and non-removable media implemented in ay method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 310. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 330 includes computer storage media in the form of volatile and/or nonvolatile memory such as read only memory (ROM) 331 and random access memory (RAM) 332. A basic input/output system 333 (BIOS), containing the basic routines that help to transfer information between elements within computer 310, such as during start-up, is typically stored in ROM 331. RAM 332 typically contains data and/or program modules that are immediately accessible to and/or presently being operated on by processing unit 320. By way of example, and not limitation, FIG. 3 illustrates operating system 334, application programs 335, other program modules 336 and program data 337.

The computer 310 may also include other removable/non-removable, volatile/nonvolatile computer storage media. By way of example only, FIG. 3 illustrates a hard disk drive 341 that reads from or writes to non-removable, nonvolatile magnetic media, a magnetic disk drive 351 that reads from or writes to a removable, nonvolatile magnetic disk 352, and an optical disk drive 355 that reads from or writes to a removable, nonvolatile optical disk 356 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 341 is typically connected to the system bus 321 through a non-removable memory interface such as interface 340, and magnetic disk drive 351 and optical disk drive 355 are typically connected to the system bus 321 by a removable memory interface, such as interface 350.

The drives and their associated computer storage media, described above and illustrated in FIG. 3, provide storage of computer-readable instructions, data structures, program modules and other data for the computer 310. In FIG. 3, for example, hard disk drive 341 is illustrated as storing operating system 344, application programs 345, other program modules 346 and program data 347. Note that these components can either be the same as or different from operating system 334, application programs 335, other program modules 336, and program data 337. Operating system 344, application programs 345, other program modules 346, and program data 347 are given different numbers herein to illustrate that, at a minimum, they are different copies. A user may enter commands and information into the computer 310 through input devices such as a tablet, or electronic digitizer, 364, a microphone 363, a keyboard 362 and pointing device 361, commonly referred to as mouse, trackball or touch pad. Other input devices not shown in FIG. 3 may include a joystick, game pad, satellite dish, scanner, or the like. These and other input devices are often connected to the processing unit 320 through a user input interface 360 that is coupled to the system bus, but may be connected by other interface and bus structures, such as a parallel port, game port or a universal serial bus (USB). A monitor 391 or other type of display device is also connected to the system bus 321 via an interface, such as a video interface 390. The monitor 391 may also be integrated with a touch-screen panel or the like. Note that the monitor and/or touch screen panel can be physically coupled to a housing in which the computing device 310 is incorporated, such as in a tablet-type personal computer. In addition, computers such as the computing device 310 may also include other peripheral output devices such as speakers 395 and printer 396, which may be connected through an output peripheral interface 394 or the like.

The computer 310 may operate in a networked environment using logical connections to one or more remote computers, such as a remote computer 380. The remote computer 380 may be a personal computer, a server, a router, a network PC, a peer device or other common network node, and typically includes many or all of the elements described above relative to the computer 310, although only a memory storage device 381 has been illustrated in FIG. 3. The logical connections depicted in FIG. 3 include one or more local area networks (LAN) 371 and one or more wide area networks (WAN) 373, but may also include other networks. Such networking environments are commonplace in offices, enterprise-wide computer networks, intranets and the Internet.

When used in a LAN networking environment, the computer 310 is connected to the LAN 371 through a network interface or adapter 370. When used in a WAN networking environment, the computer 310 typically includes a modem 372 or other means for establishing communications over the WAN 373, such as the Internet. The modem 372, which may be internal or external, may be connected to the system bus 321 via the user input interface 360 or other appropriate mechanism. A wireless networking component 374 such as comprising an interface an antenna may be coupled through a suitable device such as an access point or peer computer to a WAN or LAN. In a networked environment, program modules depicted relative to the computer 310, or portions thereof, may be stored in the remote memory storage device. By way of example, and not limitation, FIG. 3 illustrates remote application programs 385 as residing on memory device 381. It may be appreciated that the network connections shown are exemplary and other means of establishing a communications link between the computers may be used.

An auxiliary subsystem 399 (e.g., for auxiliary display of content) may be connected via the user interface 360 to allow data such as program content, system status and event notifications to be provided to the user, even if the main portions of the computer system are in a low power state. The auxiliary subsystem 399 may be connected to the modem 372 and/or network interface 370 to allow communication between these systems while the main processing unit 320 is in a low power state.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing environment, a method comprising:
  receiving at a web proxy server a request from a client for web content, in which the client has an existing authenticated connection to a web server that serves the content;
  selecting to use an unauthenticated connection instead of the existing authenticated connection to determine whether the web content is private or public;
  forwarding the request to the web server over the unauthenticated connection, and
    1) if the web content is received in response to the request, determining that the web content is public, caching the content and returning the content to the client, or
    2) if the requested content is not received because of a need for authentication, determining that the web content is private, re-requesting the web content over the existing authenticated connection, receiving the web content via the existing authenticated connection, and returning the content to the client without storing the content in a cache local to the web proxy, content stored in the cache local to the web proxy available for subsequent client requests.

2. The method of claim 1 wherein an authentication request is received in response to the request for web content to indicate the need for authentication.

3. The method of claim 1 further comprising, passing an authentication request from the web server to the client to complete an authentication process to establish the authenticated connection.

4. The method of claim 3 further comprising, at the web proxy server, marking the established connection between the client and the web server as authenticated including updating a data structure.

5. In a computing environment, a system comprising, a web proxy server configured to cache at least some public objects received from web servers, and to return a cached object in response to a client request when the object is cached and valid, and to otherwise forward the client request for the object to a web server, and a selection mechanism coupled to the web proxy server that forwards the client request for an object that may or may not be private via an unauthenticated connection even if an authenticated connection exits to determine based on the web server response whether the object is private or public in the absence of a specific cache directive, if the web server response does not include an authentication request, wherein the web server returns the requested object in response to the request via the unauthenticated connection, and wherein the web proxy server caches the object and returns the object to the client, and, if the web server response includes an authentication request, wherein the selection mechanism requests the object over the authenticated connection, the web proxy server receives the object and returns the object to the client without storing the object in a cache local to the web proxy, objects stored in the cache local to the web proxy available for subsequent client requests.

6. The system of claim 5 further comprising a data structure that indicates whether the client has an authenticated connection to the web server, and wherein the web proxy server accesses the data structure to determine whether the client has an already-existing authenticated connection to the web server.

7. The system of claim 5 wherein the web proxy server determines that the client does not have an already-existing authenticated connection to the web server, and wherein the selection mechanism returns the response indicating authentication is needed to the client to allow the client to complete the authentication process.

8. The system of claim 5 further comprising a learning mechanism coupled to the selection mechanism to establish that the requested object is known to be private.

9. The system of claim 8 wherein the learning mechanism maintains data corresponding to URLs.

10. A non-transitory computer-readable storage medium having computer-executable instructions, comprising:
receiving at a web proxy server a request from a client for web content;
determining whether the request is to be forwarded to a web server, and if so, selecting as a selected connection an unauthenticated connection or an authenticated connection for forwarding the request to the web server, and forwarding the request via the selected connection, wherein selecting comprises, selecting the unauthenticated connection as the selected connection when no prior attempt to request the content was made for this client and web page via an unauthenticated connection even if an authenticated connection exits;
receiving a response from the web server in response to the request, and
1) if the selected connection was an unauthenticated connection and web content is received in response to the request and is cacheable, caching the content and returning the content to the client; or
2) if the selected connection was an unauthenticated connection and requested content is not received because of a need for authentication, determining whether the client has an authenticated connection to the web server, and if so, selecting the authenticated connection, re-requesting the web content over the authenticated connection, and returning the content to the client without storing the content in a cache local to the web proxy, or if not, allowing the client to complete the authentication process to establish an authenticated connection, content stored in the cache local to the web proxy available for subsequent client requests.

11. The non-transitory computer-readable storage medium of claim 10 wherein selecting as the selected connection comprises, determining whether the requested content is known to be private, and if so, determining whether an authenticated connection exists for this client, and if so, selecting the authenticated connection as the selected connection.

12. The non-transitory computer-readable storage medium of claim 10 wherein selecting comprises, determining whether the requested content is known to be private, and if not known, selecting the unauthenticated connection as the selected connection.

13. The non-transitory computer-readable storage medium of claim 10 wherein determining whether the request is to be forwarded to a web server comprises accessing cache data to determine whether the content is valid in a cache.

14. The non-transitory computer-readable storage medium of claim 10 wherein an authentication request is received in response to the request for web content to indicate the need for authentication, and wherein allowing the client to complete the authentication process comprises returning the authentication request to the client.

15. The non-transitory computer-readable storage medium of claim 14 wherein the client completes the authentication process, and further comprising, marking an established connection between the client and the web server as authenticated.

\* \* \* \* \*